Nov. 21, 1939.　　　　E. G. HILL　　　　2,180,937
VEHICLE BRAKE MECHANISM
Filed June 17, 1935
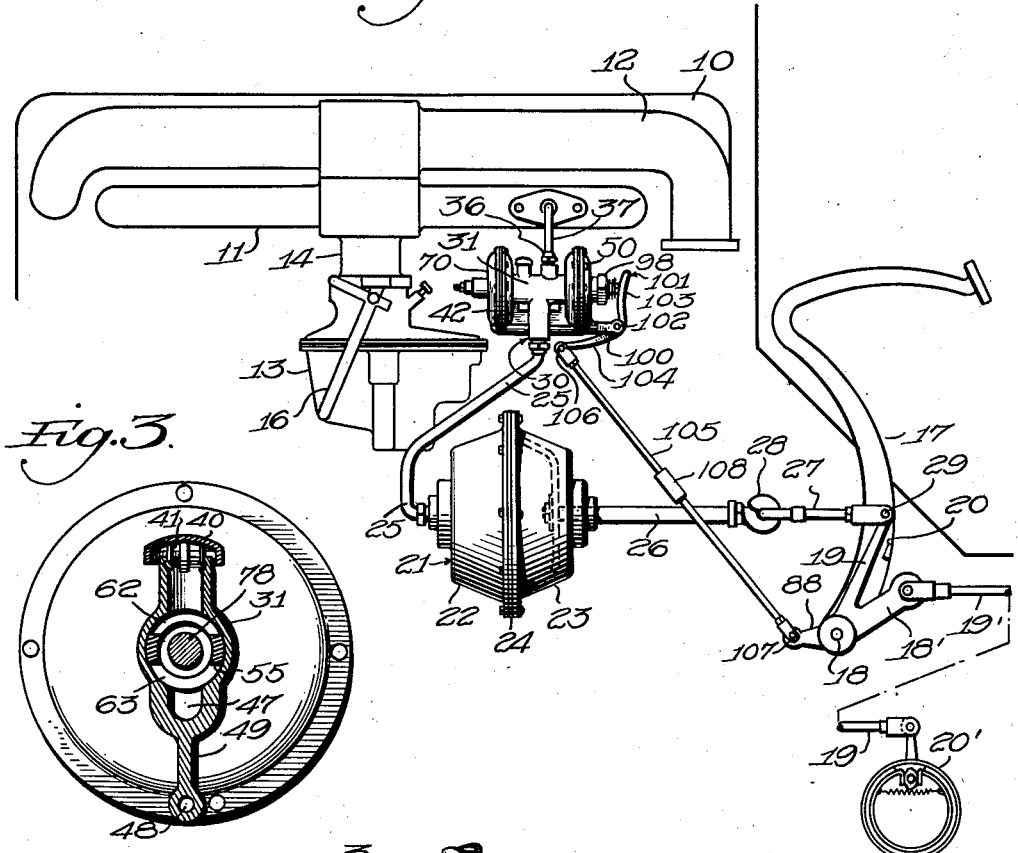
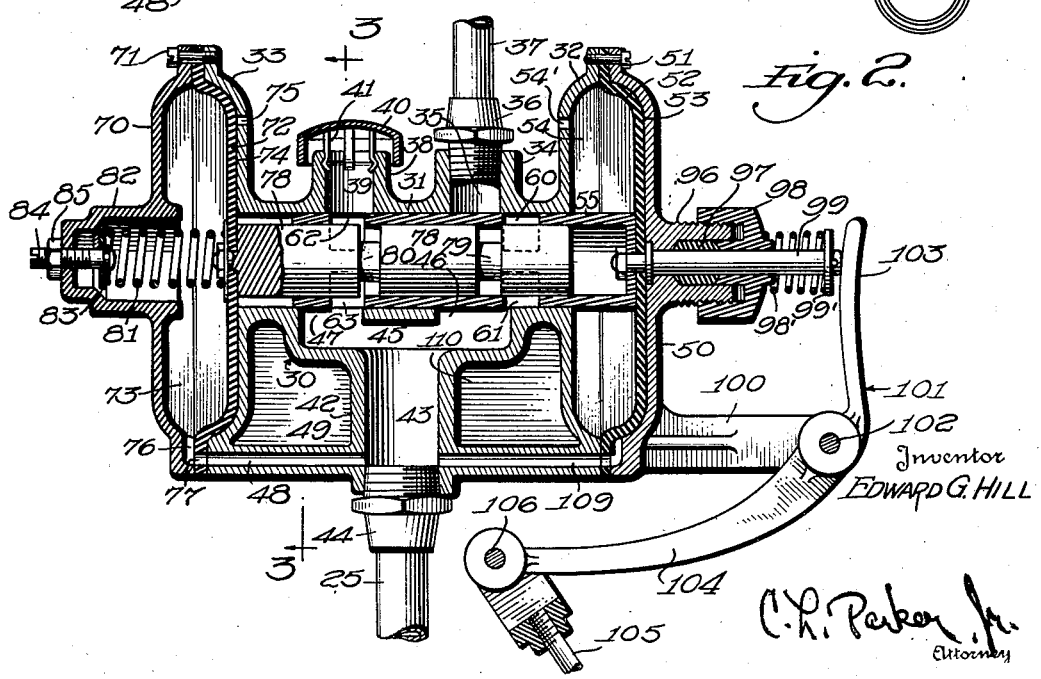
Inventor
EDWARD G. HILL
C. L. Parker Jr.
Attorney Patented Nov. 21, 1939

2,180,937

UNITED STATES PATENT OFFICE 2,180,937

VEHICLE BRAKE MECHANISM

Edward G. Hill, Richmond, Va., assignor to Hill Engineering Corporation, Richmond, Va., a corporation of Virginia Application June 17, 1935, Serial No. 27,068

10 Claims. (Cl. 303—54)

This invention relates to brake operating mechanisms, and more particularly to power brakes for motor vehicles, and is a continuation in part of my copending application Serial No. 668,656, filed April 29, 1933.

Numerous forms of power and booster brake mechanisms for motor vehicles have been developed wherein the usual brake pedal is employed for controlling a valve mechanism which, in turn, controls a differential pressure power device to determine the braking action. Brake mechanisms of such type usually employ a valve device including two cooperating valves one of which is directly connected to the brake pedal while the other is connected to the power device or to the brake pull rod or similar part. With such construction, the depression of the brake pedal a predetermined distance establishes differential pressure in the power device whereupon initial brake actuation takes place until the second valve member is moved to disconnect the power device from the source of differential pressure by movement of the operating part to which it is connected.

Such operation is well known and theoretically provides a degree of brake application corresponding to the proportionate movement of the brake pedal. In practice, these brake mechanisms have been found to be fully operative, but they are open to several serious objections. In the first place, there is always play between the parts of a vehicle braking system, and such play must be taken up by actuation of the power device before any actual brake application takes place. Obviously, therefore, the degree of brake application does not correspond to the proportionate movement of the brake pedal and this condition is complicated by the fact that the amount of play between the elements of the braking system varies in different motor vehicles and increases upon the continued operation of a given vehicle. Moreover, a substantial degree of skill is required for stopping a motor vehicle at a predetermined point. In this connection, it is well known that in conventional constructions, the increased application of the brake requires increasing foot pressure, and accordingly a motor vehicle operator can determine very accurately the degree of brake application by the pressure which he exerts against the brake pedal. Such accurate determination of brake application is impossible with the usual power brakes for the reason that brake application takes place generally in accordance with predetermined movement of the foot pedal, except for the inaccuracies pointed out above due to the play between the parts. In other words, the brake pedals of such mechanisms do not provide the "feel" present in conventional braking systems, and in actual practice it has been found that an operator will attempt to bring a vehicle to a stop ahead of or beyond a predetermined point.

An important object of the present invention is to provide a simple and efficient controlling means for the power source used in connection with vehicle brakes wherein accurate braking may be accomplished in accordance with foot pressure rather than predetermined distance of movement of the brake pedal, and wherein greatly reduced foot pressure is necessary for the application of the brakes.

A further object is to provide a mechanism of the character referred to wherein two cooperating valves are employed for controlling the power device, one valve being directly movable by the brake pedal while the other valve is movable in accordance with the degree of brake actuation instead of in accordance with predetermined movement of the brake parts as is true in present power brake constructions.

A further object is to provide cooperating valves of the type referred to for controlling communication between the power devices and the atmosphere and intake manifold of the engine, and wherein the valves are provided with ports which lap with respect to each other other to greatly improve the performance of the apparatus.

A further object is to eliminate the usual "follow up" means employed for moving the second valve with respect to the first valve and to substitute therefor means for determining the movement of the second valve in accordance with the degree of differential pressure present in the power device.

A further object is to provide a valve mechanism of the character indicated wherein the second or follow-up valve is provided with a pressure responsive actuating device connected to the power device associated with the brake for advancing the follow-up valve with respect to the brake pedal valve in accordance with the degree of differential pressure present in the power device.

A further object is to provide a control valve mechanism for power brakes wherein initial slight movement of the brake pedal takes up all play in the braking system, regardless of the extent of such play, to bring the brake members into engagement with the brake drums ready for increased brake application upon further movement of the brake pedal.

A further object is to provide means for resisting the movement of the brake pedal substantially in proportion to the degree of brake application to provide the brake pedal with the necessary "feel" whereby the operator may determine more accurately the degree of brake application.

A further object is to provide a small expansible chamber device connected to the brake pedal operated valve and influenced by differential pressure in the power device to resist the movement of the brake pedal substantially in proportion to the differential pressure in the power device to provide the brake pedal with the necessary "feel" referred to.

Other objects and advantages of the invention will become apparent during the course of the following description.

In the drawing I have shown one embodiment of the invention. In this showing:

Figure 1 is a side elevation of the device connected to the motor vehicle parts with which it is associated, Figure 2 is an enlarged central vertical sectional view through the valve mechanism and associated elements, parts being shown in elevation, and, Figure 3 is a detail sectional view on line 3—3 of Figure 2.

Referring to Figure 1, the numeral 10 designates a motor vehicle engine having the usual intake manifold 11 and exhaust manifold 12. Fuel is supplied to the motor from the carburetor 13 connected to the intake manifold 11 by a riser 14. The vehicle is provided with the usual foot pedals, and in the present instance, the brake pedal 17 has been illustrated. The pedal 17 is loosely mounted on the brake shaft 18 and the latter is provided with an operating arm 19 fixed thereto. A lug 20 is carried by the pedal 17 to operate against the arm 19 when the pedal 17 is depressed by the foot of the operator. The arm 19 carries an integral arm 18' connected to the usual brake pull rod 19', and this rod is connected for operation to conventional brake mechanisms, one of which is preferably associated with each wheel of the vehicle and one of which is indicated as a whole by the numeral 20'.

A power device of the vacuum type is employed for operating the brake arm 19 and is designated as a whole by the numeral 21. The power device may be of the usual type and preferably includes casing sections 22 and 23, and a diaphragm 24 arranged with its peripheral portion clamped between the adjacent ends of the casing sections. These casing sections provide chambers on opposite sides of the diaphragm, one of which constitutes a suction chamber connected to a source of suction in a manner to be described through a suction pipe 25. At the opposite side of the power device, a rod or shaft 26 projects and is connected at one end to the diaphragm. The other end of the rod 26 is connected to one end of a cable 27, as at 28, and the opposite end of the cable is connected as at 29 to the end of the brake operating arm 19.

The control mechanism comprises a valve mechanism housed in a casing indicated as a whole by the numeral 30. The casing includes an elongated cylindrical portion 31 in which the valves to be described are mounted to partake of reciprocating movement. At its ends, the casing is provided with substantially circular enlarged portions 32 and 33, formed integral with the valve casing. Intermediate its ends and to one side thereof, the casing is provided with a boss 34 having a port 35 therethrough leading into the interior of the valve cylinder 31. A union 36 is threaded into the outer end of the boss 34 and is connected to one end of a vacuum conduit 37 leading to the intake manifold 11 as shown in Figure 1.

Preferably on the same side as the boss 34, the valve casing is further provided with a boss 38 having a port 39 therethrough communicating with the interior of the valve cylinder. The port 39 communicates directly with the atmosphere and is preferably capped to assist in excluding dust and other foreign material from the valve cylinder. In the present instance a cap 40 has been shown, and this cap may be supported in position by resilient fingers 41 engaging within the interior of the boss 38.

The valve casing is provided with an integral projection 42 at one side having a passage 43 therethrough. A union 44 is threaded in the lower end of the passage 43 and is connected to the other end of the vacuum pipe 25 previously described. The passage 43 communicates at its upper end with a passage 45 extending longitudinally of the valve casing and communicating at its ends with ports 46 and 47 preferably arranged respectively diametrically opposite the ports 35 and 39. A conduit 48 preferably formed integral with the valve casing, communicates at one end with the passage 43 and extends through the circular enlargement 33 for a purpose to be described. The conduit 48 is connected to the body of the valve casing by an integral web 49.

A circular cap 50 is arranged over the circular enlargement 32 and is secured thereto by screws or other fastening elements 51. A flexible diaphragm 52 is secured between the edges of the cap 50 and enlargement 32 and the space between the latter elements is divided by the diaphragm to form chambers 53 and 54. The chamber 54 is vented to the atmosphere through a small port 54'. A cylindrical valve 55 is adapted to reciprocate in the valve cylinder 31 and is connected at one end to the diaphragm 52.

The valve 55 is cylindrical, as previously stated, and to one side of the center of this valve, the valve is provided with an arcuate port 60 adapted to register with the port 35. Preferably in the plane of the port 60, the valve 55 is further provided with a port 61 adapted to register with the port 46. Under conditions to be referred to, the ports 60 and 61 are adapted to communicate with each other to establish communication between the ports 35 and 46. Adjacent its other end, the valve 55 is provided with a similar pair of arcuate ports 62 and 63 adapted to register respectively with the ports 39 and 47. Communication between the ports 62 and 63, established in a manner to be described, is adapted to afford communication between the ports 43 and 47 and the atmosphere through the port 39.

A cap 70 is arranged over the circular enlargement 33 and is secured thereto by screws or the like 71. These screws also serve to clamp a diaphragm 72 in position between the cap 70 and enlargement 33, and the latter elements are divided by the diaphragm to form chambers 73 and 74. The chamber 74 is vented to the atmosphere through a suitable port 75. The cap 70 is provided with a channel or passage 76 communicating with the passage 48 through an opening 77 in the edge portion of the diaphragm 72.

A valve 78 is mounted to slide within the valve 55 and is provided with spaced annular grooves 79 and 80 forming passages adapted to communicate respectively between the ports 60 and 61, and the ports 62 and 63. The valve 78 normally occupies the position shown in Figure 2 with the passage 80 communicating with the ports 62 and 63, and with the passage 79 out of registration with the ports 60 and 61. In this connection, it will be noted that the remote limits of the ports 79 and 80 are spaced apart a distance slightly greater than the distance between the inner limits of the ports 60 and 62. When the two valves are in the neutral position with respect to each other, therefore, there is a constant leakage through both ports 79 and 80. This feature is of great importance inasmuch as it provides extremely rapid operation with the relatively low differential pressures present, and it eliminates "hunting", thus causing the valves to be arrested in their movement at the proper points.

The diaphragm 72 is secured to the adjacent end of the valve 78, and a compresison spring 81 operates against the diaphragm 72 to normally urge the valve 78 to its normal position shown in Figure 2. The spring 81 projects into a hollow extension 82 formed coaxial with the valve 78. The outer end of the spring 81 seats against a cup 83 mounted on the end of an adjusting screw 84 threaded in the end of the extension 82, and a lock nut 85 surrounds the screw 84 to secure it in adjusted position.

Means are provided for connecting the diaphragm 52 to the brake pedal to be actuated thereby. The cap 50 carries an axial threaded extension 96 in which is arranged suitable packing 97, the packing gland being compressed by the threaded cap 98. A rod 99 extends through the packing gland and is connected at its inner end to the adjacent end of the valve 55. A spring 98' surrounds the outer end of the stem 99 and the latter carries a washer 99' against which the spring operates to urge the valve 55 to its normal position shown in Figure 2. The cap 50 is provided with an integral bracket arm 100 to which a lever 101 is pivotally connected as at 102. The lever is of the bell crank type and includes an upwardly extending arm 103 preferably curved as shown in Figure 2 to operate squarely against the end of the stem 99 throughout the range of movement of the lever, without introducing any substantial lateral force against the stem 99. The lever 101 further includes a lower arm 104 as shown in Figures 1 and 2. A pull rod 105 is pivotally connected at its upper end as at 106 to the lever arm 104, and is pivotally connected at its lower end as at 107 to an arm 88 formed integral with the arm 19. The rod 105 may be formed of two separate sections arranged in end to end relation and connected by a turn buckle 108.

As previously stated, the passage 48 is provided for connecting the passage 43 to the chamber 73. A passage 109, similar to the passage 48, is preferably employed for affording communication between the passage 43 and the chamber 53, for a purpose to be described. The material forming the passage 109 is preferably integral with the valve casing and a preferably integral web 110 connects the passage 109 to the adjacent portions of the valve casing.

The operation of the device is as follows:

As is well known, the initial movement imparted to a conventional brake pedal takes up the play between the brake bands and brake drums, whereupon subsequent movement of the brake pedal accomplishes the desired braking action. With the present device, initial slight movement of the brake pedal automatically takes up the play in the braking system and application of the brakes beyond such point is prevented except upon further movement of the brake pedal. Referring to Figures 1 and 2, it will be noted that depression of the brake pedal 17 swings the arm 88 about the axis of the shaft 18, and initial movement of the brake pedal takes place without imparting movement to the arm 19 since the lug 20 is spaced therefrom.

Such initial movement of the brake pedal and arm 88 exerts a pull on the rod 105, thus swinging the bell crank lever 101 about its pivot to cause the arm 103 to transmit movement to the valve 55. This initial movement carries the ports 60 and 61 into partial registration with the valve groove 79 to connect the power device to the intake manifold, and simultaneously moves the ports 62 and 63 out of registration with the groove 80 to disconnect the power device from the atmosphere. The power device then operates to pull the shaft 26 and cable 27, and thus the arm 19 will swing about its pivot to operate the arm 18' and transmit a pulling movement to the brake pull rod 19'. This operation takes place rapidly up to the point of initial engagement of the brake bands with the brake drum, to take up all play in the braking system. From that point there will be no further brake application, assuming that the brake pedal has been only slightly depressed, until the brake pedal is moved downwardly to a greater extent. In this connection, it will be noted that the valve groove 79 has only a slight lead if any over the ports 60 and 61, while there is a definite slight lap between the valve groove 80 and the ports 62 and 63. Only a slight movement of the valve stem 99, incident to a correspondingly slight movement of the brake pedal, is therefore necessary to move the ports 60 and 61 into partial registration with the valve groove 79, and to move the ports 62 and 63 slightly beyond registration with the valve groove 80.

The initial movement of the diaphragm of the power device takes place without a sufficient drop in pressure in the vacuum connections to affect the position of the diaphragm 72. In other words, the initial exhausting of the air from the vacuum lines takes place with a substantial and unresisted decrease in the capacity thereof due to the relatively free movement of the diaphragm of the power device, incident to play between the parts of the braking system. At the point where all of the play is taken up between the parts of the braking system, that is, when the brake bands reach the point of initial contact with the brake drums, resistance will be offered to the movement of the diaphragm of the power device whereby the communication of the power device with the intake manifold results in an instantaneous drop in pressure at such point. This drop in pressure is communicated to the chamber 73 through the passage 48, whereupon atmospheric pressure operating in the chamber 74 through the port 75 moves the diaphragm 72 a slight distance, depending upon the drop in pressure in the chamber 73. This drop in pressure, however, is bound to occur to a sufficient extent to move the valve 78 a sufficient distance to the left as viewed in Figure 2 to move the passage 79 so that it is almost but not quite, completely disconnected from the ports 60 and 61, the movement of the valve 78 moving the port 80 so that it communicates with the ports 62 and 63 to the same limited extent that communication exists between the port 79 and the ports 60 and 61. The leakage of air into the passage 45 thus will balance the exhaustion of air therefrom, and accordingly the pressure in the passage 43, and consequently in the casing 22 of the power device, will remain constant. At such point, motion of the valve 78 will be arrested and there will be no further brake application, assuming that the brake pedal is stopped after being slightly depressed, as will become apparent.

It will be apparent that if communication through the port 79 were completely cut off prior to the opening of communication through the port 80, the momentum of the valve 78 and associated parts would carry the valve 78 slightly beyond the point at which communication is cut off through the port 79. Thus the valve 78 would not stop at exactly the desired point, but would carry slightly past such point to slightly open the port 80 to communication with the atmosphere and thus admit air into the passages 43 and 45. The increased pressure therein would react against the diaphragm 72 to close the port 80 to the atmosphere and again slightly open the port 79 with the intake manifold to again reduce pressure in the passage 43 and chamber 73.

Thus, upon the stopping of the movement of the valve 55, the valve 78 would be caused to "hunt" instead of instantaneously and accurately stopping at the neutral point with respect to the valve 55. With the present construction, the spacing of the remote limits of the ports 79 and 80 slightly further apart than the spacing of the inner limits of the sets of the ports of the valve 55 prevents the valve 78 from "hunting". It will be apparent that when the valve 78 moves toward the left as viewed in Figure 2, following the transmission of similar movement to the valve 55, the port 80 will be slightly opened to the atmosphere prior to the closing of the port 79 to the intake manifold, and the resulting admission of air has the effect of graduating the pressure in the passage 43 to prevent the valve 78 from "hunting". In other words, the pressure in the passage 43 starts to slightly increase just prior to the point at which the valves 55 and 78 reach neutral position with respect to each other, thus overcoming the momentum of the valve 78 by slightly increasing the pressure in the chamber 73. The arrangement of the valve ports, therefore, prevents the "hunting" of the valve 78 and results in the instantaneous stopping of this valve in its neutral position with respect to the valve 55.

While the foregoing description describes the functioning of the parts upon slight initial operation of the pedal 17 in order to take up lost motion in the braking system, the relative arrangement of the ports of the valve 55 and 78 has the same effect regardless of the point at which the valve 55 is stopped during actuation of the brake pedal 17, the port 80 being always slightly opened to the atmosphere just prior to the closing of the port 79 to the intake manifold. In other words, the effective exhaustion of air through the port 79 is reduced in proportion to the degree to which this port is opened, as it approaches a closed position with respect to the ports 60 and 61, since, as such position is approached, air is admitted at a relatively slow rate through the port 80 in the manner described.

Assuming that the operator has only slightly depressed the brake pedal and then stopped movement thereof, all play in the braking system will be taken up and the brake bands will lightly engage the brake drums, whereupon there will be no further transmission of braking movement since the valves 55 and 78 will have reached neutral position with respect to each other in the manner previously described. From such point, the operator may further depress the brake pedal, thus moving the valve 55 further to the left as viewed in Figure 2, whereupon the ports 62 and 63 move completely beyond the port 80, while the ports 60 and 61 open communication through the port 79.

This operation results in the further exhaustion of air from the power device, whereupon further braking action will occur until the reduction in pressure in the diaphragm chamber 73 moves the valve 78 to the left a distance corresponding to the movement which has been transmitted to the valve 55. Thereupon, the valves 55 and 78 will again assume neutral position with respect to each other and no further reduction in pressure in the system will occur, since, in the neutral position of the valves with respect to each other, the leakage of air into the system through the port 80 exactly balances the exhaustion of air through the port 79.

While the foregoing operation assumes that the operator initially slightly depressed the brake pedal to take up the play in the braking system prior to further operation of the brake pedal, such operation has been described to bring out the fact that initial slight movement of the brake pedal results in the taking up of all of the play in the braking system regardless of the total amount of play existing throughout the braking system. This function occurs regardless of the stopping of the brake pedal after slight initial movement, and it will be apparent that the operator may depress the brake pedal from its fully released position to any desired depressed position, depending upon the degree of braking action desired. The ports 60 and 61, and 62 and 63 are elongated toward their remote limits to permit the brake pedal to be initially fully depressed, if desired, without moving the ports 60 and 61 beyond the ports 79, and to permit the complete releasing of the brake pedal from any depressed position, without moving the ports 62 and 63 to the right beyond the port 80, as viewed in Figure 2.

Assuming that the operator progressively depresses the brake pedal from the fully released position, the valve 55 will move progressively toward the left as viewed in Figure 2 to progressively exhaust air from the power device. The reduction in pressure thus occurring in the system reacts in the chamber 73 against the diaphragm 72, and thus the valve 78 will be progressively moved toward the left as viewed in Figure 2.

The distance that the valve 78 will travel in the manner described obviously depends upon the degree of movement imparted to the valve 55. In other words, the longer the movement imparted to the valve 55, the greater will be the reduction in pressure in the power device to accomplish correspondingly greater brake application, before the valve 78 moves a sufficient distance to balance communication through the valve ports.

Accordingly it will be apparent that brake application takes place to the extent that the brake pedal is depressed, and upon the releasing of the brake pedal, the spring 98' will return the valve 55 to the normal position, thus disconnecting the intake manifold from the power device and connecting the latter to the atmosphere through ports 62 and 63 and groove 80. The releasing of the brakes can take place progressively, if desired, and it will be apparent that if the pedal 17 is partially released and then stopped, the brakes will be released to a corresponding extent. The partial releasing of the brakes moves the ports 60 and 61 to the right, as viewed in Figure 2, beyond the port 79, while the ports 62 and 63 move into registration with the groove 80.

As the pressure increases in the system incident to the admission of air, a corresponding increase in pressure occurs in the chamber 73, thus permitting the spring 81 to move the valve 78 toward the right, the power device, during such operation, being progressively released to reduce brake application. As the valve 78 approaches neutral position with respect to the valve 55, slight leakage will occur between the groove 79 and ports 60 and 61 as the port 80 approaches closed position.

The admission of air through the port 80 is partially overcome in its effect by the leakage through the ports 60 and 61, thus reducing the rate of increase of pressure in the passage 43. This reduction in the rate of increase in pressure is communicated to the chamber 73 to retard the movement of the valve 78 and this valve will stop when it reaches neutral position with respect to the valve 55. Thus "hunting" of the valve 78 is present regardless of the direction of movement of this valve with respect to the valve 55, and the brakes may be accurately released to any desired extent.

In the event of the failure of the device for any reason, however, the operator is enabled to operate the brakes conventionally by depressing the pedal 17, whereupon the lug 20 will engage and operate the arm 19. The lost motion between the lug 20 and arm 19, however, is never taken up completely during the operation of the device since initial communication between the power device and the manifold is accomplished before the brake pedal is depressed a distance insufficient to take up the play between the lug 20 and arm 19.

While the device is fully operative for applying the brakes of a vehicle in accordance with the degree of movement of the pedal 17, it is desirable to provide some means for increasingly resisting the movement of the pedal 17 so that the operator may determine the degree of brake application in accordance with the "feel" of the pedal. For this purpose, the passage 109 is provided between the passage 43 and the chamber 53. As the foregoing operation takes place, it will be apparent that continued brake application is accomplished by progressively reducing the pressure in the power device, and this continued reduction in pressure is communicated to the chamber 53 to resist the movement of the diaphragm 52 as the application of the brakes progressively continues. The resistance to the movement of the diaphragm 52 is obviously transmitted to the brake pedal 17, but is not sufficient to require any substantial physical effort to operate the brake pedal. Increase in resistance however takes place progressively throughout the range of movement of the brake pedal, and to a degree directly proportionate to the degree of braking action, to provide the desired "feel" in the operation of the brake pedal.

It will be noted that the present device is intended to be operated by differential pressure generated through the medium of the partial vacuum existing in the intake manifold of a motor vehicle engine. The differential pressure thus generated, while ample for use in applying the brakes of a motor vehicle, is relatively slight. The opening of the different valve ports, therefore, does not result in establishing pressure equalization or pressure differential as rapidly as would be true if higher differential pressures were available. At the same time, extremely rapid operation is highly desirable. By arranging the ports in the manner referred to, there will be a slight leakage through both ports 79 and 80, when these ports are centered with respect to the ports 60 and 61, and 62 and 63, since each of the ports 79 and 80 will have a slight lead with respect to its associated port or ports. This leakage does not affect the operation of the apparatus for any given position of the pedal 17, since a neutral position will be automatically reached wherein atmospheric and vacuum leakage will be balanced and thus will not affect the differential pressure present in the power device. On the other hand, assuming that the brake pedal has been partially depressed to effect partial brake application and the operator then desires additional brake application, the depression of the brake pedal will immediately close the slight leakage occurring between the port 80 and the ports 62 and 63, and will increase the already existing communication between the port 79 and the ports 60 and 61. Thus instead of initially opening slight communication through the latter ports, initial communication will be afforded to a greater extent, thus providing very rapid operation.

From the foregoing, it will be apparent that the present invention provides a simple and efficient power brake means for motor vehicles wherein very slight initial depression of the brake pedal causes all of the play in the parts of the braking system to be immediately taken up regardless of the amount of play which exists. The device accordingly is distinguished from the present types of so-called "follow-up" valves wherein the taking up of play in the braking system requires brake pedal movement corresponding to the amount of play existing between the parts. It also will be apparent that the present device effects the "follow-up" valve action by utilizing the pressure differential operating to apply the brakes instead of utilizing the movement of one of the elements of the braking system as is the present practice in power brakes. Attention also is invited to the fact that the present brake operates to transmit a resistance to the movement of the brake pedal proportionate to the degree of brake application, thus providing the highly desirable "feel" in the brake pedal whereby the operator may gage more accurately the degree to which the brakes are applied. While the resistance to the movement of the brake pedal is proportionate to brake application, this resistance is relatively slight, and very little effort is required to depress the brake pedal 17 to its fullest extent.

In the drawings, the valve mechanism has been illustrated as being connected to the conventional brake pedal. It will be apparent, however, that the particular means employed for actuating the brake mechanism is of no importance.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Control valve mechanism for a differential pressure operated motor comprising a valve casing having a passage communicating with the motor and having a pair of ports communicating with sources of fluid at different pressures, a pair of valves in said casing for controlling communicating between said passage and said pair of ports, each of said valves having a pair of spaced ports with the ports of one valve arranged closer together than the ports of the other valve, the remote limits of the ports of said first named valve being spaced apart a distance slightly greater than the inner limits of the ports of the other valve, means for manually moving one of said valves, and fluid pressure operated means for controlling the position of the other valve, said fluid pressure operated means being responsive to pressures in said passage.

2. Control valve mechanism for a differential pressure operated motor comprising a valve casing having a passage communicating with the motor and having a pair of ports communicating with sources of fluid at different pressures, a pair of valves in said casing for controlling communication between said passage and said pair of ports, each of said valves having a pair of spaced ports with the ports of one valve arranged closer together than the ports of the other valve, the remote limits of the ports of said first named valve being spaced apart a distance slightly greater than the inner limits of the ports of the other valve, means for biasing each of said valves in one direction to a normal position disconnecting said passage from one port of said casing and connecting it to the other port of said casing, means for manually moving one of said valves in the other direction, and fluid pressure operated means for moving the other valve in the other direction, said fluid operated means being responsive to pressures in said passage.

3. Control valve mechanism for a differential pressure operated motor comprising a valve casing having a passage communicating with the motor and having a pair of ports communicating with sources of fluid at different pressures, a pair of valves in said casing for controlling communication between said passage and said pair of ports, each of said valves having a pair of spaced ports with the ports of one valve arranged closer together than the ports of the other valve, the remote limits of the ports of said first named valve being spaced apart a distance slightly greater than the inner limits of the ports of the other valve, means for manually moving one of said valves, a fluid pressure chamber, and pressure responsive means in said chamber connected to the other valve, said chamber being connected to said passage to be influenced by pressures therein.

4. Control valve mechanism for a differential pressure operated motor comprising a valve casing having a passage communicating with the motor and having a pair of ports communicating with sources of fluid at different pressures, a pair of valves in said casing for controlling communication between said passage and said pair of ports, each of said valves having a pair of spaced ports with the ports of one valve arranged closer together than the ports of the other valve, the remote limits of the ports of said first named valve being spaced apart a distance slightly greater than the inner limits of the ports of the other valve, means for biasing each of said valves in one direction, means for manually moving one of said valves in the other direction, a fluid pressure chamber connected to said passage to be influenced by pressures therein, and a pressure movable member in said chamber connected to the other valve to move it in the other direction in accordance with changes in pressure in said chamber.

5. Control valve mechanism for a differential pressure operated motor comprising a valve casing having a passage communicating with the motor and having a pair of ports communicating with sources of fluid at different pressures, a pair of valves mounted in said casing for relative rectilinear movement for controlling communication between said passage and said pair of ports, each of said valves having a pair of spaced ports with the ports of one valve arranged closer together than the ports of the other valve, the remote limits of the ports of said first named valve being spaced apart a distance slightly greater than the inner limits of the ports of the other valve, said valves occupying normal relative positions with one port of one valve disconnected from the corresponding port of the other valve, manual means for moving one of said valves away from its normal position, a spring biasing the other valve to its normal position, and fluid pressure operated means for overcoming said biasing means to move said last mentioned valve in accordance with variations in pressure in said passage.

6. Control valve mechanism for a differential pressure operated power device comprising a pair of valves relatively movable with respect to each other and each having port means affording communication between said power device and the atmosphere upon relative movement of said valves in one direction, and between said power device and a source of differential pressure upon relative movement of said valves in the other direction, the outer limits of the port means of one valve being spaced apart a distance slightly greater than the distance between the inner limits of the port means of the other valve whereby said valves are adapted to assume a neutral position with said power device communicating to a slight degree with both the atmosphere and the source of differential pressure, means for manually moving one of said valves, and means responsive to the differential pressure in the power device for moving the other valve.

7. Control valve mechanism for a differential pressure operated power device comprising a pair of valves relatively movable with respect to each other and each having port means affording communication between said power device and the atmosphere upon relative movement of said valves in one direction, and between said power device and a source of differential pressure upon relative movement of said valves in the other direction, the outer limits of the port means of one valve being spaced apart a distance slightly greater than the distance between the inner limits of the port means of the other valve whereby said valves are adapted to assume a neutral position with said power device communicating to a slight degree with both the atmosphere and the source of differential pressure, means for manually moving one of said valves, a differential pressure device connected to the other valve, and a spring urging said other valve in one direction, said differential pressure device communicating with said power device to be influenced by the differential pressure therein to move said other valve against the tension of said spring.

8. Control valve mechanism for a differential pressure operated power device comprising a pair of telescoping valves relatively slidable with respect to each other and each having port means affording communication between said power device and the atmosphere upon relative movement of said valves in one direction and between said power device and a source of differential pressure upon relative movement of said valves in the other direction, the outer limits of the port means of one valve being spaced apart a distance slightly greater than the distance between the inner limits of the port means of the other valve whereby said valves are adapted to assume a neutral position with said power device communicating to a slight degree with both the atmosphere and the source of differential pressure, means for manually moving one of said valves, and means responsive to the differential pressure in the power device for moving the other valve.

9. Control valve mechanism for a differential pressure operated power device comprising a pair of telescoping valves relatively slidable with respect to each other and each having port means affording communication between said power device and the atmosphere upon relative movement of said valves in one direction and between said power device and a source of differential pressure upon relative movement of said valves in the other direction, the outer limits of the port means of one valve being spaced apart a distance slightly greater than the distance between the inner limits of the port means of the other valve whereby said valves are adapted to assume a neutral position with said power device communicating to a slight degree with both the atmosphere and the source of differential pressure, means biasing each of said valves in one direction, means for manually moving one valve in the other direction, and means responsive to increasing differential pressures in said power device for moving the other valve in said other direction.

10. Control valve mechanism for a differential pressure operated power device comprising a pair of telescoping valves relatively slidable with respect to each other and each having port means affording communication between said power device and the atmosphere upon relative movement of said valves in one direction and between said power device and a source of differential pressure upon relative movement of said valves in the other direction, the outer limits of the port means of one valve being spaced apart a distance slightly greater than the distance between the inner limits of the port means of the other valve whereby said valves are adapted to assume a neutral position with said power device communicating to a slight degree with both the atmosphere and the source of differential pressure, means biasing each of said valves in one direction, means for manually moving one valve in the other direction, and a differential pressure device connected to the other valve and communicating with said power device to be influenced by increasing differential pressures therein for moving the other valve in said other direction.

EDWARD G. HILL.